June 21, 1966  J. KEYES  3,256,823
VARIABLE TORQUE EDDY CURRENT DRIVE
Filed Feb. 5, 1964  3 Sheets-Sheet 1
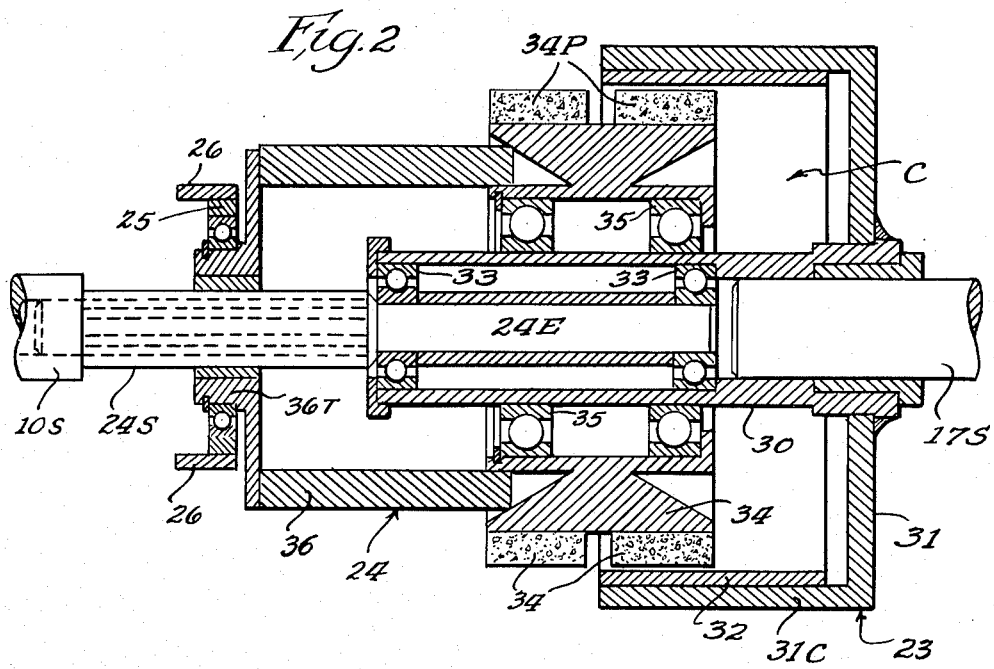
Inventor
Jack Keyes
By Mann, Brown & McWilliams.
Attys.

June 21, 1966  J. KEYES  3,256,823
VARIABLE TORQUE EDDY CURRENT DRIVE
Filed Feb. 5, 1964  3 Sheets-Sheet 2

Inventor
Jack Keyes
By Mann, Brown & McWilliams
Attys.

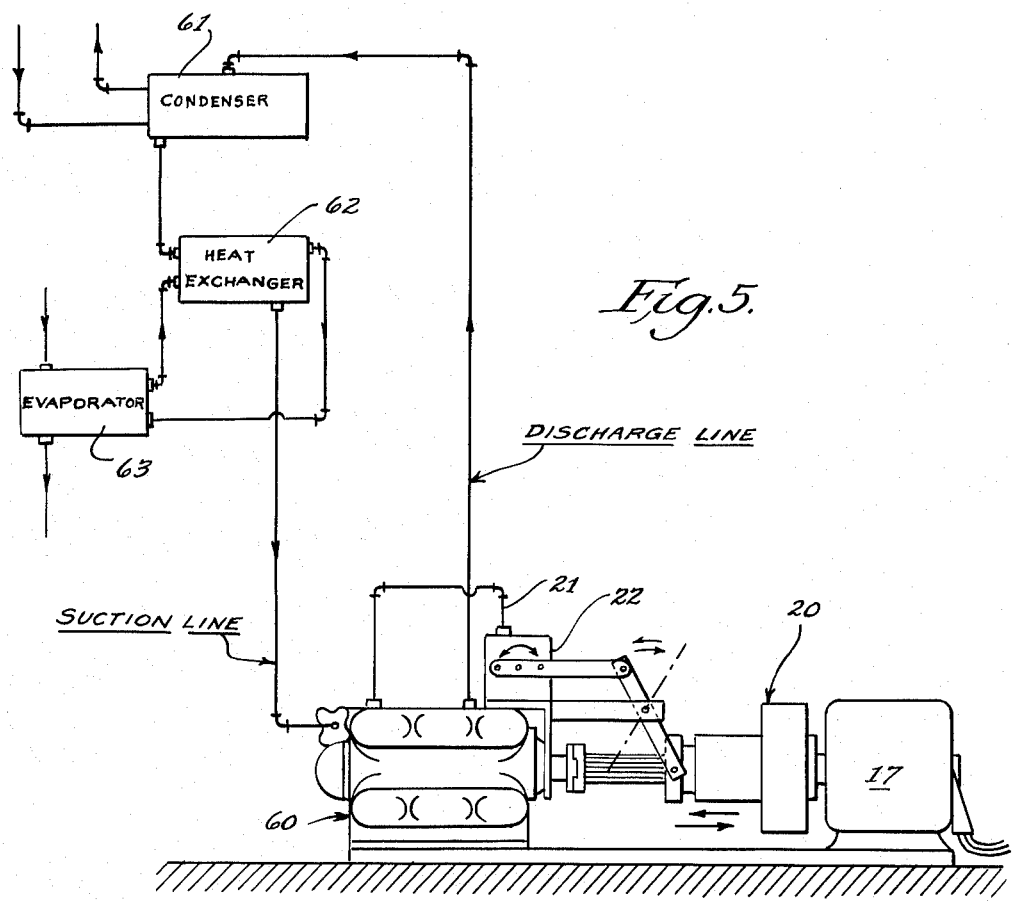

3,256,823
VARIABLE TORQUE EDDY CURRENT DRIVE
Jack Keyes, Glencoe, Ill., assignor to International Telephone and Telegraph Corporation, a corporation of Maryland
Filed Feb. 5, 1964, Ser. No. 342,684
3 Claims. (Cl. 103—35)

This invention relates to an automatically controlled torque transmitting coupling for use between a constant speed drive motor and a variable output device such as a pump, and more particularly, the invention is concerned with an arrangement that incorporates a steplessly adjustable variable torque eddy current drive having a uniform depth air gap extruding radially between relatively rotatable close clearance cylindrical rotor peripheries that are in magnetic flux coupled relation across the air gap and that are relatively axially slideable to provide an expanded steplessly variable range of torque versus slip characteristics.

The advantages of permanent magnet eddy current drives as torque transmitting couplings include no maintenance, smooth response and vibration elimination, and high efficiency, all well understood. Eddy current drives have a limited range of slip speed beyond which the torque transmitting capacity saturates or, more usually, falls off. However, a drive having an expanded steplessly variable range is uniquely suited to a number of automatic control applications.

The principal object of the present invention is the provision of an automatically controlled torque transmitting eddy current drive coupling for use in systems having broad range load requirements.

A more specific object is the provision of a permanent magnet radial air gap eddy current drive capable of stepless adjustment axially to provide a smoothly varying torque versus slip characteristic of expanded range.

Other and further objects of the present invention will be apparent from the following description and claims, and are illustrated in the accompanying drawings which show structure embodying preferred features of the present invention and the principles thereof, and what is now considered to be the best mode in which to apply these principles.

In the accompanying drawings forming a part of this specification and in which like numerals are employed to designate like parts throughout the same:

FIG. 1 is a fragmentary elevational view diagrammatically depicting the principal elements of a constant pressure domestic water system employing a steplessly adjustable variable torque eddy current drive;

FIG. 2 is a lengthwise sectional view illustrating the construction details of the drive;

FIG. 5 is a diagrammatic view of an arrangement employing a steplessly adjustable variable torque eddy current drive as a capacity control for the compressor of a refrigeration system.

Figure 3:
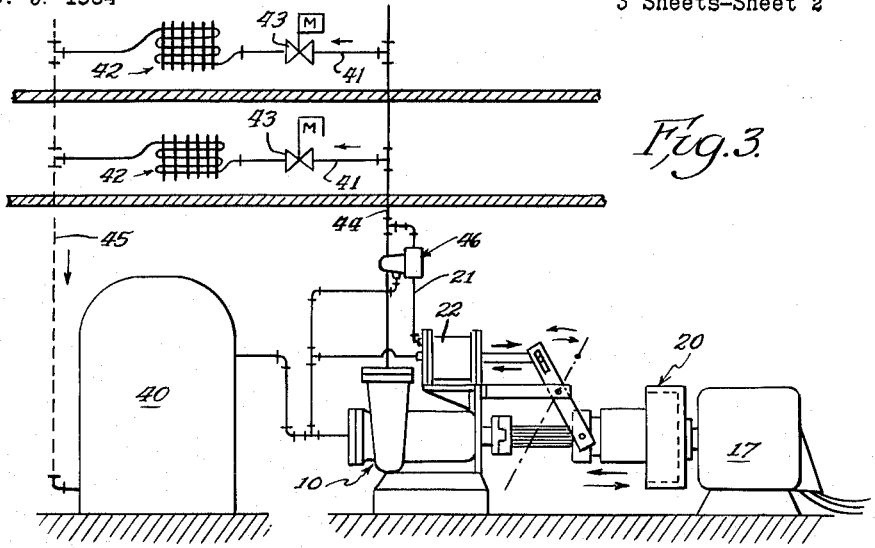
FIG. 3 is a fragmentary elevational view illustrating the drive as applied to provide a constant head hydronic system.

Referring now to the drawings, flow system applications utilizing a steplessly adjustable variable torque eddy current drive constructed in accordance with this invention are shown in FIGS. 1, 3 and 5. The particular eddy current drive construction used in these systems to effect automatic control for maintaining a selected system flow condition substantially constant, is illustrated in detail in FIG. 2.

In the domestic water system arrangement shown in FIG. 1, a centrifugal pump is designated generally at 10 and as is diagrammatically illustrated, its inlet 11 is arranged for connection to a city water pressure line and its outlet 12 is arranged for connection to a main riser 13 that extends upwardly in a multistory building, the lower floors of which are indicated at F. Each floor may have a local water supply circuit 14 tapped off of the riser and equipped with shut off valves 15 for controlling a faucet 16 that discharges to atmosphere when the shut off valve is open. A conventional constant speed motor 17 is shown for driving the pump 10 which is intended in this system to function so as to provide a constant pressure to the main riser 13 under conditions wherein the water pressure from the city system is low or else is subject to wide variation. To accomplish this, the pump 10 must be capable of changing speed in a fashion to compensate for reductions or increases of water inlet pressure. In addition, the pump 10 must be capable of changing speed to maintain constant pressure at the water main 13 through a wide range of variations in the water demands of the system.

The arrangement disclosed in FIG. 1 provides an automatically controlled power transmitting means that includes an eddy current drive 20 connected between the motor 17 and pump 10 and having a variable torque transmitting capacity regulated by a sensor 21 which is responsive to the head pressure conditions at the output of the pump to produce a deviation signal representative of any changes of the head pressure from some predetermined value which it is desired to maintain. The sensor 21 is here represented as a tap line leading from the riser 13. A servo mechanism 22 is responsive to the signal from the sensor and has means for positioning a mechanical linkage L which is, in turn, connected to control the eddy current drive 20 to vary its torque transmitting capacity in a direction that will overcome the change in head pressure which produced the original sensor signal.

The eddy current drive 20 has input and output rotors 23 and 24, respectively, mounted to rotate about a common axis and having a slip responsive torque transmitting relationship dependent upon a magnetic flux coupling through a radially directed air gap. The motor output shaft 17S is connected to the input rotor 23 and the pump input shaft 10S is connected to a splined output shaft 24S that is drivingly engaged by the output rotor 24 and that accommodates axial shifting movement of the output rotor 24 for varying the torque transmitting capacity of the eddy current drive.

The linkage L is connected to the output rotor 24 through a thrust transmitting rotary bearing 25 and the linkage includes a lengthwise shiftable drive arm 22A associated with the servo mechanism 22 and a double armed lever 26 pivotally mounted on a stationary bracket 27 and having its opposite ends connected respectively, to the drive arm 22A and to the thrust bearing 25, in a lost motion relationship by means of slots provided adjacent its opposite ends.

Thus, assuming the system of FIG. 1 to be operating normally and the pressure at the pump output suddenly drops, the sensor 21 will respond to produce a deviation signal causing the servo mechanism 22 to move its drive arm 22A to the left as viewed in FIG. 1 and correspondingly causing the output rotor 24 to move to the right into greater overlapping engagement with the input rotor 23 to increase the torque transmitting capacity of the drive and thereby increase the drive speed and hence the output pressure of the pump.

As is best seen in FIG. 2 the input or driving rotor includes a tubular cylindrical shaft 30 defining the axis of rotation for the rotors and providing at one end a noncircular socket for receiving the motor shaft 17S in rotary driving connection. A cup-shaped structure 31 is rigid with the rotor shaft and has a cylindrical outer wall 31C of magnetic material encircling a portion of the shaft in uniformly spaced relation to define a circularly uniform annular chamber C for the output rotor 24. A cylindrical wall 32 of current conductive material such as copper, lines the cylindrical wall 31C of the cup-shaped structure 31 and bounds the outer periphery of and extends substantially the length of the annular chamber C. This wall 32 is mounted rigid to the cup-shaped structure and functions as a current conducting liner.

The driven rotor 24 includes the splined shaft 24S which has a reduced end 24E journalled in the open end of the tubular shaft by means of axially spaced rotary bearing assemblies 33. The driven or output rotor 24 includes a ring-shaped magnetic structure 34 which is journalled on the exterior of the tubular shaft through axially spaced antifriction rotary bearing assemblies 35, the inner races of which are freely axially slideable along the tubular shaft 30. The ring-shaped structure 34 has a plurality of permanent magnet poles 34P spaced circumferentially thereabout and having pole faces directed radially outwardly to define a cylindrical pole face periphery having close clearance relatively rotatable relation to the liner wall 32 of current conductive material. The pole face periphery has an axial length substantially corresponding to that of the liner 32 and its supporting ring structure 34 is adjustable axially between a position of full radial overlap between the pole face periphery and the liner and a position of substantially no radial overlap between the pole face periphery and the liner.

Finally, the driven rotor 24 includes an end cup 36 rigid with the magnetic ring structure 34 and the end cup 36 terminates in a tubular stub 36T at its free end which receives the thrust transmitting rotary bearing assembly 25 to permit mechanical positioning of the output rotor along the axis of the tubular shaft 30. The splined engagement between the tubular stub 36T and the splined shaft section 24S enables this adjustment to be made during normal operation of the device. By means of this adjustment the torque transmitting capacity is variable between a maximum corresponding to that of full radial overlap and a minimum corresponding to that of substantially no radial overlap, and this adjustment is stepless in that it may be set to any intermediate position. By this means the eddy current device 20 in accordance with this invention may respond to command signals to compensate automatically and correct for any changes in the output.

A related flow system for which the automatically controlled variable torque eddy current drive arrangement finds important use is shown in FIG. 3, wherein a constant head hot water heating system includes a boiler 40, a plurality of branch lines 41 to separate radiation gear 42 and each equipped with a control valve 43 regulating the supply of liquid to the gear and main supply and return lines 44 and 45, respectively, for the boiler. A centrifugal pump 10 is shown connected in the supply line 44 and is driven by a constant speed motor 17 through a variable torque eddy current drive 20 and under the control of a sensor 21 and servo mechanism 22 with the sensor 21 in this instance being connected through an adjustable pressure relief valve 45 that is tapped into the supply line 44 of the system.

The purpose of this pump control arrangement is to provide a constant head against all of the control valves 43. In an ordinary system using a constant speed motor 17 to drive the pump 10 directly, the head applied across a control valve can vary in amount up to the full range of variation of the pump curve depending on how many valves are opened. When a modulating system is used, the action of one valve requires the rest of the valves to reposition due to the change in flow through the pump and the corresponding change in pump head. Thus, such a modulating system "hunts" up and down the pump curve almost continually.

In the automatically controlled system shown in FIG. 3, if the pump head is kept constant by means of the adjustment of the eddy current drive, the control valves 43 can remain stationary for any given set of conditions. Each zone would have a constant flow regardless of how many other zones are on or off. This is a distinct advantage in balancing a system.

Figure 4:
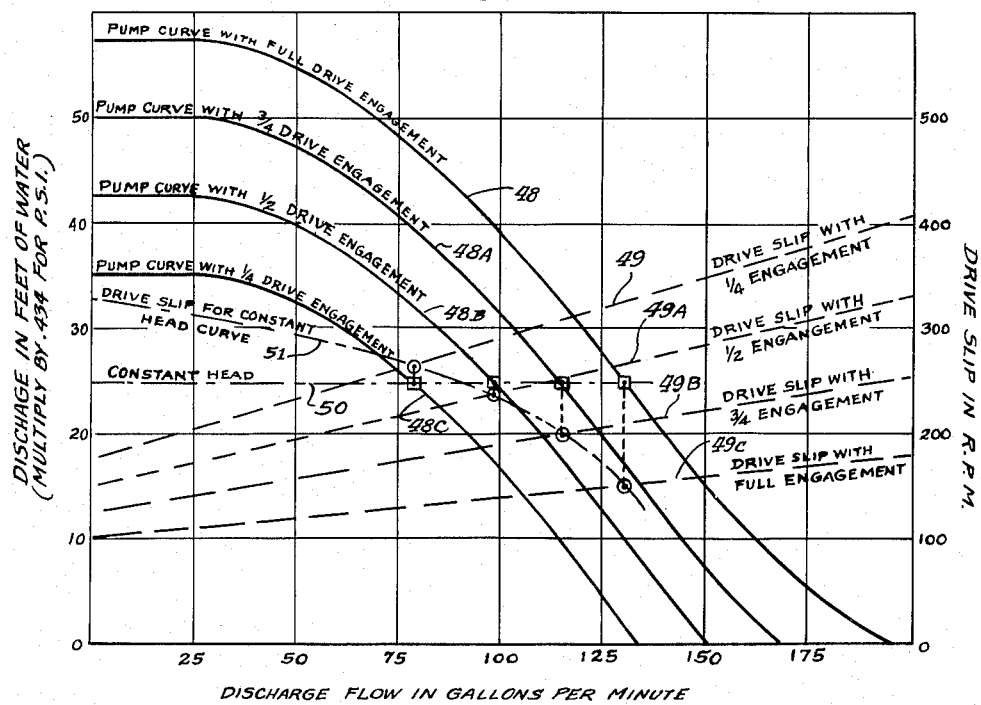
FIG. 4 is a set of performance curves for a motor, pump and variable torque eddy current drive combination.

The curves shown in the graph of FIG. 4 depict the operating characteristics for the combined arrangement of the motor 17, eddy current drive 20 and pump 10 as applied to a flow system wherein constant head is to be maintained. The pump curves 48, 48A, 48B, and 48C relate discharge head to discharge flow and were prepared by operating the combined arrangement under various conditions of engagement of the eddy current drive 20. The dashed-line curves 49, 49A, 49B, and 49C depict the drive slip of the eddy current drive 20 when operating in the combined arrangement at corresponding conditions of engagement of the drive.

To illustrate the operating characteristics of the pump 10 as powered by the motor 17 through the eddy current drive 20 in a system for maintaining constant head, a selected constant head line 50 is plotted on the graph and at the square shaped points of intersection with the pump curves 48, 48A, 48B and 48C are projected vertically to the corresponding drive slip curves to develop a series of circled points that define a resultant drive slip engagement curve 51 corresponding to the selected constant head line. This final engagement curve 51 illustrates the substantially stepless variation of the eddy current drive between its various possible positions of engagement.

Finally, in FIG. 5 a refrigeration system is shown wherein a refrigerant compressor 60 is driven by a constant speed motor 17 coupled to the compressor 60 through an eddy current drive 20 which, in turn, is controlled by a sensor 21 and a servo mechanism 22. The sensor 21 is connected to respond to the pressure at the suction manifold of the refrigeration compressor 60. As is indicated, the refrigeration system conventionally includes a condenser 61, a heat exchanger 62, and an evaporator 63. The arrangement contemplates that the sensor and servo mechanism control would provide unloaded starting and then would be brought in after the motor 17 comes up to speed. The torque transmitting capacity of the drive 20 may then be varied under the control of the sensor 21 and servo mechanism 22 to provide a stepless control from minimum to maximum compressor speeds.

There are at present no suitable variable torque transmissions for operating refrigerant compressors 60 and it is common practice to employ cylinder unloaders for regulating the compressor capacity. Alternatively on-off, multi-speed motors are employed with refrigeration compressors. In any event, the arrangement of FIG. 5 is vastly superior to any of the presently known arrangements for regulating refrigeration compressors.

Thus, while preferred constructional features of the invention are embodied in the structure illustrated herein, it is to be understood that changes and variations may be made by those skilled in the art without departing from the spirit and scope of the appending claims.

What is claimed is:
1. A steplessly adjustable variable torque eddy current drive comprising a driving rotor and a driven rotor, said driving rotor having a tubular cylindrical shaft defining an axis of rotation, a cup-shaped structure rigid with said shaft and having a cylindrical outer wall of magnetic material encircling a portion of said shaft in uniformly spaced relation to define a uniform annular chamber, and a cylindrical wall of current conductive material at the outer periphery of and extending substantially the length of said chamber and rigid with said outer wall, said driven rotor having a ring-shaped structure journalled on said shaft through antifriction rotary bearings to be movable axially and rotationally relative to said shaft, said ring-shaped structure having a plurality of permanent magnet poles spaced circumferentially thereabout and having faces directed radially outwardly to define a pole face periphery closely adjacent said wall of current conductive material and of substantially corresponding length, an end cup rigid with and projecting endwise from said ring structure and having a transverse wall outboard of said shaft and provided with a central opening, a shaft section projecting through said central opening in splined relatively axially slideable connection to said end cup and extending into said shaft in rotatably journalled relation, a mechanism for shifting said end cup and ring structure axially relative to said cup-shaped structure and shaft section, and thrust transmitting antifriction rotary bearing facilities having relatively rotatable parts, one connected to said end cup and one connected to said mechanism.

2. In a variable flow system that includes a variable speed power driven device for producing variable output to said system and a constant speed motor for driving said device, an automatically controlled power transmitting means for maintaining a flow condition substantially constant at a certain point of said system and comprising a sensor responsive to said flow condition at said point to produce a deviation signal representative of changes that may occur, a variable torque eddy current drive connected between said motor and said device and having slip responsive torque transmitting input and output rotor members, each rotatable about a common axis, said members having oppositely facing cylindrical peripheries in magnetic flux coupled close clearance relation, bearing means mounting said rotor members for relative rotary and axial movement to enable said peripheries to be shifted in stepless movement to any point in a range between a position of full overlap radially and a position of no overlap radially, and a servo mechanism responsive to the signal from said sensor and having mechanical linkage including thrust transmitting rotary bearing structure connected to one of said rotor members to produce relative axially shifting movement between said rotor members in a direction to overcome the change that produced the sensor signal.

3. In a variable flow system that includes a variable speed power driven device for producing variable flow through said system, a constant speed motor for driving said device, an automatically controlled power means for maintaining a flow condition substantially constant at a certain point of said system and comprising a sensor responsive to said flow condition at said point to produce a deviation signal representative of any change that occurs, a variable torque eddy current drive connected in slip coupled relation between said motor and said device and having input and output rotor members, each rotatable about a common axis, one of said rotor members including a cylindrical wall of magnetic material encircling said axis and a cylindrical liner of current conductive material rigid with and lining said wall, the other of said rotor members including a ring-shaped structure having a plurality of permanent magnet poles spaced uniformly about said axis and having faces directed radially outwardly to define a pole face periphery of corresponding length to said liner and receivable therein in peripherally close clearance relation thereto, means mounting said rotor members for relative rotary and axial movement to enable said pole face periphery to be shifted to any point in a range between a position of full overlap radially with said liner and a position of substantially no overlap radially with said liner, and a servo mechanism responsive to the signal from said sensor and having mechanical linkage including thrust transmitting rotary bearing structure connected to one of said rotor members to produce relative axial shifting movement between said ring-shaped structure and said liner in a direction to overcome the change that produced the sensor signal.

References Cited by the Examiner

UNITED STATES PATENTS

| | | | |
|---|---|---|---|
| 2,280,736 | 4/1942 | Winther | 310—95 X |
| 2,377,199 | 5/1945 | Adams et al. | 230—11 |
| 2,536,207 | 1/1951 | Norman | 310—94 |

MARK NEWMAN, *Primary Examiner.*

W. J. KRAUSS, *Assistant Examiner.*